Feb. 3, 1931.  M. G. CLARK ET AL  1,791,160
TRAFFIC SIGNAL INDICATOR
Filed June 27, 1928  2 Sheets-Sheet 1

INVENTORS
Mills G. Clark and
Frank R. Higley
BY Frank R. Higley
ATTORNEY

Feb. 3, 1931.     M. G. CLARK ET AL     1,791,160
TRAFFIC SIGNAL INDICATOR
Filed June 27, 1928     2 Sheets-Sheet 2

INVENTORS
Mills G. Clark and
Frank R. Higley
BY Frank R. Higley
ATTORNEY

Patented Feb. 3, 1931

1,791,160

UNITED STATES PATENT OFFICE

MILLS G. CLARK AND FRANK R. HIGLEY, OF CLEVELAND HEIGHTS, OHIO

TRAFFIC-SIGNAL INDICATOR

Application filed June 27, 1928. Serial No. 288,789.

This invention relates to automotive vehicles and to means therein for providing observation by the operation of over-head traffic signals otherwise obscured to the operator by top portions of the vehicle body. An optical system is necessarily employed, and the present invention contemplates the association of an optical system which may include refracting and reflecting elements, with the steering wheel of the vehicle.

An object of the invention is, therefore, to so combine the optical elements with the steering wheel that either may function without affecting the functioning of the other. To this end we incorporate the optical means in the rim portion of the wheel to form a part thereof adapted to be grasped by the operator.

An advantage of such an arrangement is that the image formed by the optical system is closer to the operator's eye than has heretofore been possible in other devices of corresponding purpose. Another advantage is that the image is in a more natural line of vision, and particularly is formed before the relatively dark background of the lower portion of the operator's compartment.

Another object of the invention is to so arrange the optical elements in association with the wheel that not only are forward signals made observable by the operator, but in addition, signals laterally disposed with respect to the vehicle, such as on occasions when the operator wishes to make a left turn and therefore has pulled over to the right of the traffic lane, are made observable by the operator.

Figure 1:
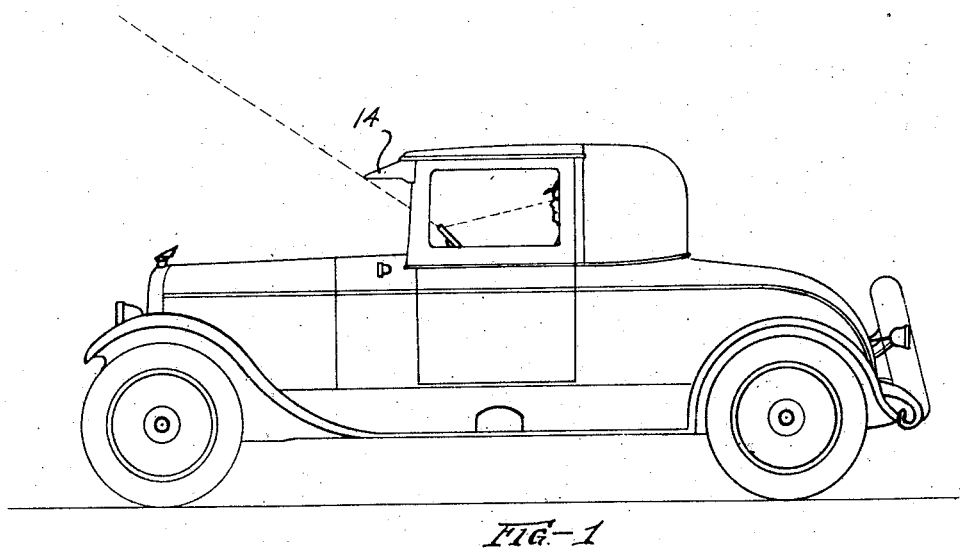
Figure 2:
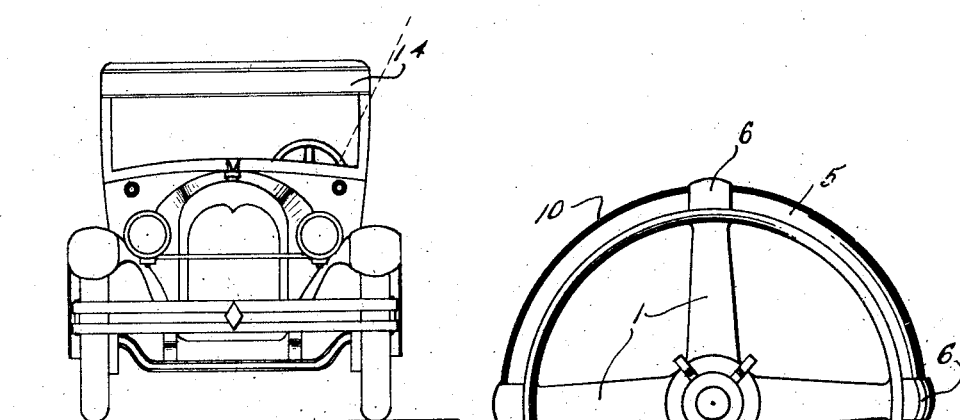
Figure 3:
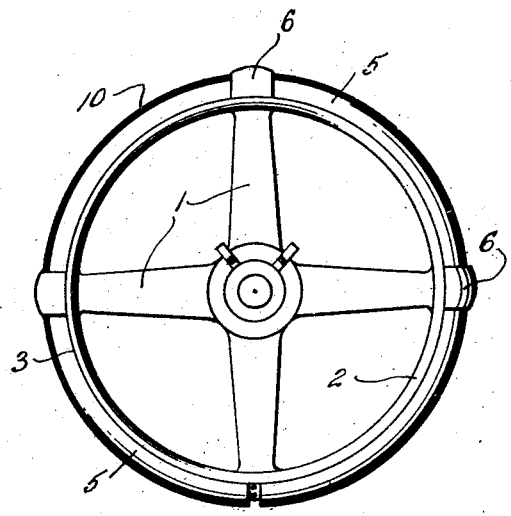
Figure 4:
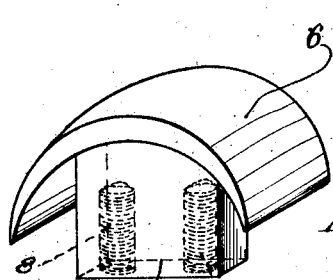

The exact nature of the invention together with further objects and advantages thereof will be apparent from the following description taken in connection with the accompanying drawings in which Fig 1 is a side elevation of an automobile in which our invention is incorporated, showing in broken lines the path by which a ray of light from a forwardly disposed traffic signal reaches the eye of the vehicle operator; Fig. 2 is similarly a front elevation of the same showing the path of the ray from a laterally disposed over-head signal; Fig. 3 is a detail view of a steering wheel in which our invention is incorporated, showing one of the clamp brackets removed; Fig. 4 is a perspective view of the clamp bracket not appearing Fig. 3; and Figs. 5-7 inclusive are enlarged details partly in section of as many alternate forms of optical arrangement contemplated by our invention, Fig. 5 being taken as in the plane of line 5—5, Fig. 3, and Figs. 6 and 7 being views corresponding with Fig. 5.

With reference now to Figs. 1-5 inclusive, according to our invention we employ the usual steering wheel spider 1 supporting a rim 2. The upper and outer portion of our rim, however, is cut away as along the line 3, Fig. 5, leaving a remainder 4 of generally segmental section.

Upon this remainder as a backing we place a number, four being indicated, of glass members 5 of sectional conformation to be described, adapted to form with the continuous backing portion 4 of the rim, a complete rim of appropriate convexity to be gripped by the vehicle operator. Thus as in Fig. 3, four members 5 are employed each extending with reference to the axis of the wheel substantially 90° thereabout. Each member 5, however, is slightly less than 90°, and is secured upon the backing portion of the rim by a clamping bracket as shown in Fig. 4, having a strap portion 6 overlying each end of the adjacent members 5, and a key portion 7 extending inwardly between the ends of the members and secured upon the rim backing portion 4 by a pair of screws entering the threaded holes 8 indicated. By this means in effect a solid steering wheel is provided, the outer portion of its rim being made up of glass sections positively secured against any movement with respect to the continuous backing portion of the rim.

Figure 5:
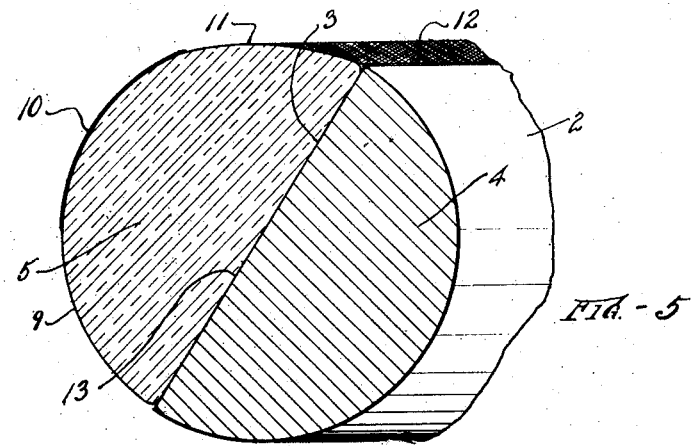

Turning now to Fig. 5, the lower peripheral portion 9 of the glass 5 is curved as indicated forming a lens. The upper peripheral portion 10 is covered with enamel, lacquer or the like, preferably of dull finish. The top portion 11 of the glass is slightly curved as indicated and has a ground or etched finish as indicated at 12. The proportion and arrangement of the parts are such that light rays from an overhead signal about thirty feet distant and toward which the face 9 is by its location on the wheel directed, will be converged by the curvature of the face 9, bent upwards by the rearward face 13 of the glass and focused upon the upper surface 12. Thus the glass 5 combines the functions of lens by virtue of the face 9, and prism by virtue of the face 13, and an erect image will be produced upon the upper face 12 of the wheel.

The field of the lens 9 may be a relatively narrow one and so adjusted, as to include the probable angle at which light from an overhead traffic signal will strike the wheel rim, as indicated Fig. 1 wherein the body top portion 14 prevents direct observation of the signal. Or the field of the lens 9 may be made wider sufficient to provide, as indicated Fig. 2, observation by the driver of overhead signals at the left of the vehicle and otherwise obstructed by the body top portion.

Figure 6:
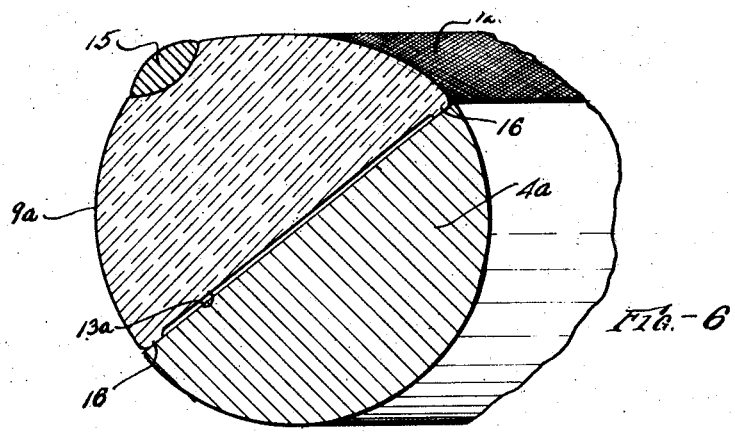

Fig. 6 shows a modified form in which such a wide angled lens 9a is provided, the field of the ground portion 12a of the glass being correspondingly greater. Here the relative angularity between these faces is such that the rear face 13a of the glass must be silvered, and in order to prevent direct bearing of the silvering against the rim backing portion 4a the silvered portion of the glass is set off from the backing by ridges 16 extending about the edges of the rear face. A metal reinforcing member 15 is shown seating in a circumferential depression in the glass between the faces 9a and 12a and adapted for protection of the glass.

Figure 7:
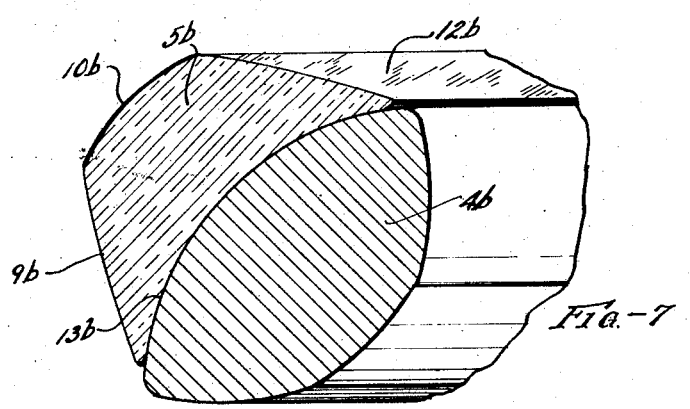

Fig. 7 shows still another form of application of our invention, in which form the rear face 13b of the glass 5b is given a curvature as indicated, forming thereof a convex reflecting surface, the faces 9b and 12b of the glass beeing substantially without curvature in the plane of the section, so that a virtually erect image above the plane of the face 12b is presented. The rim portion 4b here is shaped to fit the glass as indicated and the face 10b may be preferably finished in dull black as the face 10 in Fig. 5.

Obviously where desired certain of the glass sections may be designed to receive rays from different angles than those for which other sections are designed. Likewise only certain portions of the wheel may be provided with glass sections, others being solid as in the present art. Thus a certain quadrant of the wheel rim may be designed to receive rays substantially only from forward signals and certain other quadrants, as at the left side of the wheel, may be designed to receive rays only from laterally disposed traffic signals.

What we claim is—

1. In an automobile having a body top portion and a steering wheel, optical means at the rim of said steering wheel and comprising an optical system including a lens arranged peripherally of said wheel rim and adapted to receive rays from directions generally radial of said wheel, and means for directing said rays generally axially and upwards of said wheel to form an image visible to the operator, of a signal otherwise obscured to the operator by said body top portion.

2. In an automobile having a body top portion and a steering wheel, optical means arranged at the rim of said steering wheel and adapted to be grasped by the operator in manipulating said wheel and comprising an opitical system including a lens arranged peripherally of said wheel rim and adapted to receive rays from directions generally radial of said wheel, and means for directing said rays generally axially and upwards of said wheel to form an image visible to the operator, of a signal otherwise obscured to the operator by said body top portion.

3. A steering wheel for the purpose described, the rim of said wheel including optical means adapted to be grasped in steering manipulation, said optical means including light deflecting means adapted to receive light rays from a direction generally radial of said wheel and to form an image therefrom visible from a position generally axial of said wheel.

Signed by us, this 13th day of June, 1928.

MILLS G. CLARK.
FRANK R. HIGLEY.